United States Patent Office 2,813,872
Patented Nov. 19, 1957

2,813,872
NEW SYMPATHOLYTIC ALLYL AMINE COMPOUNDS AND A PROCESS OF MAKING SAME

Jean Schmutz, Wabern, near Bern, Switzerland, assignor to Dr. A. Wander A.-G., Bern, Switzerland, a corporation of Switzerland No Drawing. Application March 11, 1955, Serial No. 493,835

Claims priority, application Switzerland March 13, 1954

5 Claims. (Cl. 260—286)

The present invention relates to the production of new therapeutically effective allyl amines and more particularly to allyl amines of the 1,2,3,4-tetrahydroisoquinoline series, and to a process of making same.

N-alkyl derivatives of the 1,2,3,4-tetrahydroisoquinoline series have previously been investigated for their therapeutic usefulness. It was found that they possess certain adrenolytic properties. However, said adrenolytic properties were not very pronounced and only transitory. Therefore, said known compounds could not be used in therapy and actually have not been employed as therapeutic agents.

It is furthermore known that N-cinnamyl-1,2,3,4-tetrahydroisoquinoline has spasmolytic properties.

The present invention has for its object to provide new and valuable allyl amines of the 1,2,3,4-tetrahydroisoquinoline series which possess very interesting pharmacological and therapeutically useful properties and which are strongly adrenolytically and sympatholytically effective and, at the same time, of low toxicity, so that they can safely be administered to patients.

Another object of the present invention is to provide a simple and effective process of producing such new and valuable allyl amines of the 1,2,3,4-tetrahydroisoquinoline series.

A further object of the present invention is to provide new and valuable therapeutic preparations which are employed in the medical art for their surprisingly high adrenolytic and sympatholytic activity and their low toxicity.

Other objects of the present invention and advantageous features thereof will become apparent as the description proceeds.

In principle, the new compounds according to the present invention correspond to the following formula

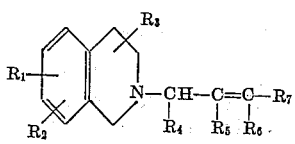

In said formula $R_1$ and $R_2$ indicate hydrogen, an alkyl radical with less than 3 carbon atoms or an alkoxy group with less than 3 carbon atoms, $R_3$, $R_4$, $R_5$, and $R_6$ indicate hydrogen or alkyl radicals with less than 3 carbon atoms whereby $R_5$ and $R_6$, together with the double bond, may form a cycloaliphatic nucleus, and $R_7$ is hydrogen, an alkyl, aralkyl, aryl, carbonyl, carboxyl, carboxylic acid amide, or carboxylic acid ester group and a substituted aryl radical.

Compounds of this type are preferably produced by condensing esters of the corresponding allyl alcohols with 1,2,3,4-tetrahydroisoquinoline or its derivatives.

It is very surprising and could not be expected that introduction of an allyl group, in place of an alkyl group, in 1,2,3,4-tetrahydroisoquinoline compounds would produce N-allyl compounds of high adrenolytic and sympatholytic activity.

It is also quite surprising that the pharmacological activity depends to a large extent upon the substituent $R_7$. While, heretofore, it was not known that N-cinnamyl-1,2,3,4-tetrahydroisoquinoline which was produced synthetically for its spasmolytic activity, also possesses a low adrenolytic activity, it was found that its adrenolytic activity is increased to a very considerable extent by the introduction of a suitable substituent in o-position of the phenyl nucleus in the cinnamyl radical. Such substituents which are capable of considerably increasing the adrenolytic activity of N-cinnamyl-1,2,3,4-tetrahydroisoquinoline are, for instance, the methyl radical and the lower alkoxy group, such as the methoxy group. Such o-substitution, furthermore, produces a new and very valuable pharmacological effect inasmuch as thereby nervous increase in blood pressure (carotid sinus reflex) is inhibited. Like substitution in p-position considerably weakens or completely suppresses the pharmacological effect, thus, further demonstrating the significance of o-substitution.

Esters of substituted allyl alcohols to be employed in the process of producing the new compounds according to the present invention, are, for instance, their halogenides, their benzene sulfonic acid esters, their toluene sulfonic acid esters, or other esters which are capable of readily reacting with the respective tetrahydroisoquinoline compound.

The reaction is preferably carried out in an inert solvent, such as ethanol, ether, benzene, toluene, or dioxane. It is of advantage to employ an excess of the amine or the reaction is carried out in the presence of a condensing agent, such as an alkali metal, an alkali hydride, or an alkali amide. The most preferred condensing agent is sodium amide.

The new allyl amine compounds of the 1,2,3,4-tetrahydroisoquinoline series are bases which form water soluble acid addition salts with inorganic acids as well as with organic acids.

The following examples serve to illustrate the present invention without, however, limiting the same thereto.

EXAMPLE 1
*N-allyl-1,2,3,4-tetrahydroisoquinoline*

7.3 g. of allyl bromide are added to 8 g. of 1,2,3,4-tetrahydroisoquinoline in 60 cc. of dioxane. The mixture is allowed to stand for 30 minutes and is then boiled under reflux for 1 hour. After cooling, the precipitated 1,2,3,4-tetrahydroisoquinoline hydrobromide is filtered off by suction, the filtrate is evaporated to dryness, and the residue is distilled.

The resulting base has a boiling point of 117–120° C. (12 mm.). Its hydrochloride crystallizes from a mixture of absolute ethanol and ether (2:1) in colorless needles melting at 197–198° C.

The procedure in the following examples is the same as in Example 1 whereby, however, the following reaction components and solvents are employed in place of allyl bromide and dioxane.

EXAMPLE 2

53.2 g. of 1,2,3,4-tetrahydroisoquinoline,
27.0 g. of crotylbromide,
100 cc. of benzene.

The resulting N-crotyl-1,2,3,4-tetrahydroisoquinoline has a boiling point of 74° C./0.07 mm.; $n_D^{21}=1.5425$.

EXAMPLE 3

11.0 g. of 1,2,3,4-tetrahydroisoquinoline,
4.2 g. of 4-chloro-Δ2-pentene,
50 cc. of dioxane.

The resulting N-(1′,3′-dimethyl)allyl-1,2,3,4-tetrahydroisoquinoline has a boiling point of 126–128° C./12 mm. Its hydrochloride crystallizes from a mixture of absolute ethanol and ether (1:1) in colorless crystals melting at 180–182° C.

EXAMPLE 4

40.0 g. of 1,2,3,4-tetrahydroisoquinoline,
19.6 g. of 6-methyl-4-chloro-$\Delta_2$-hexene,
60 cc. of dioxane.

The resulting N-(1′-isopropyl-3′-methyl) allyl-1,2,3,4-tetrahydroisoquinoline has a boiling point of 92–93° C./0.01 mm.; $n_D^{19}$=1.5266.

EXAMPLE 5

26.6 g. of 1,2,3,4-tetrahydroisoquinoline,
9.0 g. of methallyl chloride,
60 cc. of dioxane.

The resulting N-(2′-methyl)allyl-1,2,3,4-tetrahydroisoquinoline has a boling point of 125–126° C./12 mm.

Its hydrochloride crystallizes from a mixture of absolute ethanol and ether (1:1) in colorless crystals melting at 170.0–172.5° C.

EXAMPLE 6

66.5 g. of 1,2,3,4-tetrahydroisoquinoline,
32.2 g. of 1-bromo-$\Delta_2$-cyclohexene,
90 cc. of benzene.

The resulting N-$\Delta_2$-cyclohexenyl-1,2,3,4-tetrahydroisoquinoline has a boiling point of 104–106° C./0.07 mm.; $n_D^{19}$=1.5673.

Its hydrochloride crystallizes from a mixture of absolute ethanol and ether (1:1) in colorless crystals melting at 167–169° C.

EXAMPLE 7

116.0 g. of 1,2,3,4-tetrahydroisoquinoline,
77.0 g. of γ-bromo crotonic acid methyl ester,
400 cc. of benzene.

The resulting γ-(N-1,2,3,4-tetrahydroisoquinolyl) crotonic acid methyl ester has a boiling point of 117–118° C./0.08.

Its hydrochloride crystallizes from absolute ethanol in colorless, flat, rectangular plates of the melting point 194–196° C.

Saponification with dilute hydrochloric acid yields γ-(N-1,2,3,4-tetrahydroisoquinolyl) crotonic acid crystallizing from a mixture of water and acetone (1:1) in colorless needles of the melting point 189–191° C.

EXAMPLE 8

116.0 g. of 1,2,3,4-tetrahydroisoquinoline,
89.0 g. of γ-bromo crotonic acid isopropyl ester,
400 cc. of benzene.

The resulting γ-(N-1,2,3,4-tetrahydroisoquinolyl) crotonic acid isopropyl ester yields a hydrochloride which crystallizes from a mixture of absolute ethanol and ether (1:1) in colorless, flat, prismatic crystals of the melting point 193–194° C.

The ester can also be produced by esterifying γ-(N-1,2,3,4-tetrahydroisoquinolyl) crotonic acid, obtained according to Example 7, with isopropanol.

EXAMPLE 9

18.3 g. of 1,2,3,4-tetrahydroisoquinoline,
14.5 g. of p-methyl cinnamyl bromide,
60 cc. of dioxane.

The resulting N-(3′-p-methyl phenyl-$\Delta_{2'}$-propenyl)-1,2,3,4-tetrahydroisoquinoline has a boiling point of 152° C./0.09 mm.

Its hydrochloride crystallizes from a mixture of absolute ethanol and ether (2:1) in colorless crystals melting at 213–215° C.

EXAMPLE 10

22.7 g. of 1,2,3,4-tetrahydroisoquinoline,
18.0 g. of o-methyl cinnamyl bromide,
60 cc. of dioxane.

The resulting N-(3′-o-methyl phenyl-$\Delta_{2'}$-propenyl)-1,2,3,4-tetrahydroisoquinoline has a boiling point of 143–145° C./0.06 mm.

Its hydrochloride crystallizes from absolute ethanol in colorless, prismatic crystals melting at 201–203° C.

EXAMPLE 11

6.0 g. of 1,2,3,4-tetrahydroisoquinoline,
4.6 g. of p-methoxy cinnamyl bromide,
30 cc. of dioxane.

The resulting N-(3′-p-methoxy phenyl-$\Delta_{2'}$-propenyl)-1,2,3,4-tetrahydroisoquinoline has a boiling point of 174–178° C./0.09 mm.

Its hydrochloride crystallizes from a mixture of absolute ethanol and ether (2:1) in colorless crystals of the melting point 196–199° C.

EXAMPLE 12

13.3 g. of 1,2,3,4-tetrahydroisoquinoline,
11.3 g. of o-methoxy cinnamyl bromide,
50 cc. of dioxane.

The resulting N-(3′-o-methoxy phenyl-$\Delta_{2'}$-propenyl)-1,2,3,4-tetrahydroisoquinoline has a boiling point of 171–174° C./0.09 mm.

Its hydrochloride crystallizes from a mixture of absolute ethanol and ether (2:1) in scaly colorless crystals of the melting point 158–161° C.

EXAMPLE 13

9.7 g. of 3-methyl-1,2,3,4-tetrahydroisoquinoline,
6.9 g. of o-methyl cinnamyl bromide,
20 cc. of absolute dioxane.

The resulting N-(3′-o-methyl phenyl-$\Delta_{2'}$-propenyl)-3-methyl-1,2,3,4-tetrahydroisoquinoline has a boiling point of 152–155° C. (0.1 mm.).

Its hydrochloride crystallizes from a mixture of isopropanol and ether in colorless crystals of the melting point 168–171° C.

EXAMPLE 14

*γ-(N-1,2,3,4-tetrahydroisoquinolyl) crotonic acid amides*

Amides of γ-(N-1,2,3,4-tetrahydroisoquinolyl) crotonic acid are obtained either by condensing 1,2,3,4-tetrahydroisoquinoline with the corresponding γ-bromo crotonic acid amide or by reacting γ-(N-1,2,3,4-tetrahydroisoquinoline) crotonic acid ester as they are obtained according to Examples 7 and 8, with the corresponding amine. Following characteristic properties of such amides are given:

(a) *Amide.*—The base crystallizes from acetone in colorless plates of the melting point 164–166° C. Its hydrochloride is obtained from a mixture of absolute ethanol and ether (2:1) in colorless, prismatic needles of the melting point 204–206° C.

(b) *Monomethylamide.*—The base crystallizes from a mixture of ether and petroleum ether (1:1) in colorless needles of the melting point 111–112° C.

(c) *Monoethylamide.*—The base crystallizes from a mixture of acetone and ether (1:1) in colorless needles of the melting point 128–129° C. Its hydrochloride is obtained from a mixture of absolute ethanol and ether (1:1) in colorless needless of the melting point 197.5–198.5° C.

(d) *Mono-n-propyl amide.*—The base crystallizes from a mixture of acetone and ether (1:3) in needles of the melting point 120° C. Its hydrochloride is obtained from a mixture of absolute ethanol and ether (1:1) in colorless crystals of the melting point 175–178° C.

(e) *Mono-isopropyl amide.*—The base crystallizes from a mixture of acetone and ether (1:3) in colorless needles of the melting point 162–163° C. Its hydrochloride is obtained from the same solvent mixture in colorless needles of the melting point 201–203° C.

(f) *Mono-secondary butyl amide.*—The base crystallizes from a mixture of acetone and ether (1:5) in colorless prismatic needles of the melting point 129.5–130° C. Its hydrochloride is obtained from a mixture of absolute ethanol and ether (1:2) in colorless needles of the melting point 189–192° C.

(g) *Cyclohexyl amide.*—The base crystallizes from acetone in colorless, flat needles of the melting point 183–185° C. Its hydrochloride is obtained from a mixture of absolute ethanol and ether (1:1) in colorless needles of the melting point 181–183° C.

(h) *Anilide.*—The base crystallizes from a mixture of acetone and ether (1:4) in colorless crystals of the melting point 169–172° C. Its hydrochloride is obtained from a mixture of absolute ethanol and ether (1:2) in colorless crystals of the melting point 195–198° C.

(i) *Mono-ethanol amide.*—The hydrochloride crystallizes from a mixture of absolute ethanol and ether (1:2) in colorless crystals of the melting point 167–169° C.

(j) *Morpholide.*—The hydrochloride crystallizes from a mixture of absolute ethanol and ether (1:2) in colorless scaly crystals of the melting point 207–210° C. with decomposition.

(k) *Dimethylamide.*—The hydrochloride crystallizes from a mixture of absolute ethanol and ether (1:1) in colorless crystals of the melting point 211.0–212.5° C.

(l) *Diethylamide.*—The hydrochloride crystallizes from a mixture of absolute ethanol and ether (1:1) in colorless leaflets of the melting point 178–181° C.

(m) *Di-n-propylamide.*—The hydrochloride crystallizes from a mixture of absolute ethanol and ether (1:1) in colorless needles of the melting point 128.5–130.0° C.

(n) *Di-n-butylamide.*—The hydrochloride crystallizes from a mixture of absolute ethanol and ether (1:1) in colorless crystals of the melting point 95–98° C.

In place of 1,2,3,4-tetrahydroisoquinoline and 3-methyl-1,2,3,4-tetrahydroisoquinoline used in the preceding examples, there can be employed equimolecular amounts of other 1,2,3,4-tetrahydroisoquinoline compounds which may be substituted in the benzene nucleus by methyl or ethyl radicals or by methoxy, ethoxy, or methylenedioxy groups or in the hydrogenated heterocyclic nucleus by methyl or ethyl radicals. Such starting materials are, for instance, 1-methyl-1,2,3,4-tetrahydroisoquinoline,
6,7-dimethoxy-1,2,3,4-tetrahydroisoquinoline,
5-methoxy-1,2,3,4-tetrahydroisoquinoline,
6,7-diethoxy-1,2,3,4-tetrahydroisoquinoline,
3-ethyl-1,2,3,4-tetrahydroisoquinoline,
3-methyl-6,7-dimethoxy-1,2,3,4-tetrahydroisoquinoline,
6-methyl-1,2,3,4-tetrahydroisoquinoline,
7-methyl-1,2,3,4-tetrahydroisoquinoline,
6,7-methylene dioxy-1,2,3,4-tetrahydroisoquinoline,
6-methoxy-tetrahydroisoquinoline.

Such 1,2,3,4-tetrahydroisoquinoline starting materials are obtained, for instance, by condensing corresponding β-phenyl alkylamine compounds with aldehydes and especially with formaldehyde.

In place of the other reactive component having an allyl group in its molecule as used in the preceding examples, i. e. in place of the esters of allyl, crotyl, $\Delta_2$-pentenyl, 6-methyl-$\Delta_2$-hexenyl, methallyl, $\Delta_2$-cyclohexenyl, o- and p-methyl cinnamyl, o- and p-methoxy cinnamyl alcohols and of γ-hydroxy crotonic acid ester or amides, there can be employed equimolecular amounts of esters of other allyl alcohols of the formula

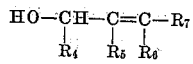

wherein $R_4$, $R_5$, and $R_6$ are hydrogen, or an alkyl group with less than 3 carbon atoms, or $R_5$ and $R_6$, together with the double bond, may form a cycloaliphatic nucleus and wherein $R_7$ is hydrogen, an alkyl, aralkyl, aryl, carbonyl, carboxyl, carboxylic acid amide, or carboxylic acid ester group. Such compounds are, for instance, $\Delta_2$-pentenyl-4-bromide,
Allyl iodide,
$\Delta_1$-butene-3-bromide,
$\Delta_1$-pentene-3-bromide,
$\Delta_2$-pentene-4-bromide,
4-phenyl-$\Delta_2$-butene-1-bromide,
3-phenyl-$\Delta_2$-propene-1-methyl-1-bromide,
3(p-tolyl)-$\Delta_2$-propene-1-bromide,
3-aceto-$\Delta_2$-propene-1-bromide,
3-benzo-$\Delta_2$-propene-1-bromide,
Benzene sulfonic acid allyl ester,
p-Toluene sulfonic acid crotyl ester,
3-phenyl-$\Delta_2$-propene-2-methyl-1-chloride,
3-o-methylphenyl-$\Delta_2$-propene-2-methyl-1-bromide,
o-Methyl-cinnamyl-benzene-sulfonic acid ester.

As stated above, the new compounds have a surprisingly high adrenolytic and sympatholytic activity and, at the same time, a low toxicity so that they can be used in therapy. The following table shows clearly that, for instance, by substitution of the allyl side chain by alkylated phenyl groups or by carboxy alkylamide groups a surprising increase in adrenolytic activity is achieved while at the same time the toxicity is considerably reduced.

| Tetrahydroiso-quinoline compound | Adrenolyt. dosis, mg./kg. chat | Action on C. S. R.[1] | Act. on contract. of nictitating membrane | Tox. L. D. 50 (intravenously), mg./kg.chat | Therap. index L. D. 50, Adrenolyt. dosis |
|---|---|---|---|---|---|
| N-cinnamyl | 0.5 | — | + | 17 | 34 |
| N-(3'-o-methyl phenyl-$\Delta_2$'-propenyl) | 0.4 | ++ | ++ | 25 | 62.5 |
| N-(3'-o-methoxy phenyl-$\Delta_2$'-propenyl) | 0.2 | + | + | 25 | 125 |
| N-(γ-crotonic acid ethylamide) | 0.4 | ++ | + | 125 | 312.5 |
| N-(γ-crotonic acid dimethylamide) | 0.4 | ++ | + | 125 | 312.5 |

[1] C. S. R.=Carotis-Sinus-Reflex.

In this table ++ high activity, + slight activity, and — no activity.

It is evident that the present invention provides the medical profession with new and valuable drugs which are successfully employed, for instance, in the treatment of periferal vascular disease (arteriosclerosis, diabetes), Morbus Buerger (Ulcus varicosum cruris, etc.), certain cases of hypertonic disease (Phaeochromocytoma).

The new compounds are preferably administered in the form of their acid addition salts with inorganic acids, such as hydrochloric acid, hydrobromic acid, sulfuric acid, phosphoric acid, and the like as well as with organic acids, such as citric acid, tartaric acid, maleic acid, malonic acid, malic acid, succinic acid, benzoic acid, phthalic acid, nicotinic acid, isonicotinic acd, acetic acid, formic acid.

Said salts are produced, for instance, by dissolving the free base in a suitable anhydrous solvent and by introducing the equimolecular amount of the respective acid. If required, the mixture is heated and the solvent is evaporated should the resulting acid addition salt be soluble in the solvent used.

The new compounds are therapeutically administered, either in the form of tablets, pills, dragees, powders, solutions, or other orally administrable preparations or they may be injected subcutaneously, intramuscularly, or even intravenously in the form of sterile aqueous solutions or of isotonic saline solutions. The maximum single dose is about 50 mg. and the maximum daily dose is about 150 mg. when given perorally or 10 mg. and 30 mg., respectively when given parenterally.

The new compounds are preferably used in their dilute form, thus, allowing better and more economical use to be made thereof.

In the administration of such compounds in capsules as powders, a fine uniform dispersion of the active product throughout said powder is desirable. Such a fine dispersion can be achieved, for instance, by intimately mixing and milling the compound in a ball mill with a solid, pulverulent extending agent to the desired degree of fineness, or by impregnating the already milled, finely powdered, solid carrier with a mixture of the active compound in water or other suitable solvents, and then removing the water or solvent.

When preparing tablets, pills, dragees, and the like, and shaped solid preparations for oral administration, the commonly used diluting agents, binders, and the like, are employed, such as sugar, lactose, talcum, starch, bolus alba, and as binders, pectin, gelatin, gum arabic, methyl cellulose, yeast extract, agar, tragacanth, and others.

The content of active compound in such preparations may vary. It is, of course, of advantage, that the active compound be present in said preparations in such an amount that a suitable dosage will be ensured. The unit dose should contain not less than 0.1% of the active compound. The preferred amounts to be employed in tablets and like shaped solid preparations are between about 5% and about 25% of the weight on the unit. To use greater amounts is, of course, also possible although administration of suitable dosage becomes somewhat cumbersome.

Injectable preparations contain preferably between about 0.5% and about 2% of the active compound. They may, of course, also contain larger amounts.

Of course, many changes and variations in the reaction components used, the solvents employed, the reaction conditions, temperature and duration, the salt-forming acids employed, the methods of working up and of purifying the reaction products, the compounding and preparing of compositions to be used in therapy, and the like may be made by those skilled in the art in accordance with the principles set forth herein and in the claims annexed hereto.

It may be pointed out that the most preferred substituents $R_7$ given hereinbefore in the formulas and in the claims are hydrogen, lower alkyl, lower alkyl mononuclear aryl, such as benzyl, and mononuclear aryl, such as phenyl, o-tolyl radicals, the carboxyl group, the carboxylic acid amide group wherein the amide group may be substituted by one or two lower alkyl, cyclohexyl, or phenyl radicals or may form a morpholine, piperidine, or piperazine nucleus, and the carboxylic acid ester group wherein the ester group preferably is formed with a lower alkanol. The aryl radical $R_7$ must be a substituted aryl radical when $R_3$, $R_4$, $R_5$, and $R_6$ are hydrogen, said aryl radical carrying lower alkyl or lower alkoxy substituents, preferably in o-position to the allyl side chain. When one of said $R_3$, $R_4$, $R_5$, and $R_6$ is another substituent than hydrogen, the substituent $R_7$ may also be an unsubstituted aryl radical. $R_7$ in formula given is preferably alkyl with less than four carbon atoms and alkyl or alkoxy substituted aryl radical with less than three alkyl carbon atoms.

| Base | Ester compound | End product |
| --- | --- | --- |
| 6-methyl-1, 2, 3, 4-tetrahydroisoquinoline. | Cinnamylchloride. | N-(3'-phenyl-propen-2', 3'-yl)-6-methyl-1, 2, 3, 4-tetrahydroisoquinoline. |
| Do. | o-methyl-cinnamyl-benzosulfonic acid ester. | N-(3'-o-methylphenyl-propene-2', -3'-yl)-6-methyl-1, 2, 3, 4-tetrahydroisoquinoline. |
| 6-methoxy-1, 2, 3, 4-tetrahydroisoquinoline. | o-methyl-cinnamyl-bromide. | N-(3'-o-methylphenyl-propene-2'-,-3'-yl)-6-methoxy-1, 2, 3, 4-tetrahydroisoquinoline. |
| Do. | γ-brom-crotonic acid methyl ester. | *N-(-γ-crotyl acid methyl ester)-6-methoxy-1,2,3,4-tetrahydroisoquinoline. |
| 6,7-dimethoxy-1,2,3,4-tetrahydroisoquinoline. | o-methyl-cinnamyl-bromide. | N-(3'-o-methylphenyl-propene-2',-3',-yl)-6,7-dimethoxy-1,2,3,4-tetrahydroisoquinoline. |
| 6,7-methylenedioxy-1,2,3,4-tetrahydroisoquinoline. | do. | N-(3'-o-methylphenyl-propene-2'-,-3'-yl)-6,7-methylenedioxy-1,2,3,4-tetrahydroisoquinoline. |
| Do. | γ-brom-crotonic acid methyl ester. | **N-(γ-crotyl acid methyl-ester)-6,7-methylenedioxy-1,2,3,4-tetrahydroisoquinoline. |
| 1,2,3,4-tetrahydroisoquinoline. | β-methyl-γ-brom-crotonic acid methyl ester. | γ-(N-1,2,3,4-tetrahydroisoquinolyl)-β-methyl crotonic acid methyl ester. |

*γ-(N-6-methoxy-1,2,3,4-tetrahydroisoquinolyl)-crotonic acid methyl ester.
**γ-(N-6,7-methylenedioxy-1,2,3,4-tetrahydroisoquinolyl)-crotonic acid methyl ester.

EXAMPLE 15

26.6 g. of 1,2,3,4-tetrahydroisoquinoline
28.8 g. of o-methyl-cinnamyl-benzosulfonic acid ester
80 cm.³ of benzene.

The resulting N-(3'-o-methylphenyl-propene-2',3'-yl)-1,2,3,4-tetrahydroisoquinoline has a boiling point of 144–145° C./0.07 mm. Its hydrochloride crystallizes from absolute ethanol in colourless, prismatic crystals melting at 201–203° C.

EXAMPLE 16

26.6 g. of 1,2,3,4-tetrahydroisoquinoline
30.2 g. of o-methyl-cinnamyl-p-toluosulfonic acid ester
80 cm.³ of toluol.

The resulting N-(3'-o-methylphenyl-propene-2',3'-yl)-1,2,3,4-tetrahydroisoquinoline has the same properties as in Example 15.

EXAMPLE 17

13.3 g. of 1,2,3,4-tetrahydroisoquinoline and 3.9 g. of sodiumamide are boiled three hours in 100 cm.³ absolute dioxane after which 21.1 g. of o-methoxy-cinnamylchloride are dropped in and the mixture boiled for one hour. After cooling off the precipitated sodiumbromide is filtered off and the N-(3'-o-methoxyphenyl-propene-2',3'-yl)-1,2,3,4-tetrahydroisoquinoline isolated by distillation. The base has a boiling point of 172–174° C./0.09 mm. Its hydrochloride crystallizes from a mixture of absolute ethanole-ether (1:1) in colourless crystals melting at 158–161° C.

EXAMPLE 18

13.3 g. of 1,2,3,4-tetrahydroisoquinoline and 2.4 g. of sodiumhydride (or 2.3 g. of pulverised sodium) are boiled four hours in 100 cm.³ absolute toluol after which 21.1 g. o-methoxy-cinnamylbromide are dropped in and the mixture boiled for one hour. After cooling off the precipitated sodiumbromide is filtered off and the N-(3'-o - methoxyphenyl - propene - 2',3' - yl) - 1,2,3,4 - tetrahydroisoquinoline isolated by distillation. The base has the same properties as in Example 17.

I claim:

1. The γ-(N-1,2,3,4-tetrahydroisoquinolyl) crotonic acid amide compound of the formula

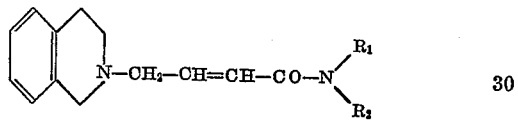

wherein $R_1$ indicates a member selected from the group consisting of hydrogen and an alkyl radical with 1 to 4 carbon atoms and $R_2$ indicates an alkyl radical with 1 to 4 carbon atoms and the acid addition salts of said amide.

2. γ-(N-1,2,3,4-tetrahydroisoquinolyl) crotonic acid ethylamide.

3. γ-(N-1,2,3,4-tetrahydroisoquinolyl) crotonic acid dimethylamide.

4. γ-(N-1,2,3,4-tetrahydroisoquinolyl)-crotonic acid isopropylamide.

5. γ-(N-1,2,3,4-tetrahydroisoquinolyl)-crotonic acid n-propylamide.

References Cited in the file of this patent

UNITED STATES PATENTS

| 2,344,095 | Kulz | Mar. 14, 1944 |

FOREIGN PATENTS

| 725,734 | Germany | Oct. 1, 1942 |
| 726,008 | Germany | Oct. 6, 1942 |